US012630112B2

(12) United States Patent
Benliyan et al.

(10) Patent No.: US 12,630,112 B2
(45) Date of Patent: May 19, 2026

(54) COVER AND VEHICLE INTERIOR COMPONENT

(71) Applicant: AUDI AG, Ingolstadt (DE)

(72) Inventors: Sarkis Benliyan, Ingolstadt (DE); Sebastian Birke, Pfaffenhofen an der Ilm (DE); Andreas Gastl, Buxheim (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 19/102,463

(22) PCT Filed: Sep. 19, 2023

(86) PCT No.: PCT/EP2023/075795
    § 371 (c)(1),
    (2) Date: Feb. 10, 2025

(87) PCT Pub. No.: WO2024/061902
    PCT Pub. Date: Mar. 28, 2024

(65) Prior Publication Data
    US 2026/0048715 A1      Feb. 19, 2026

(30) Foreign Application Priority Data

Sep. 21, 2022    (DE) .......................... 102022124207.2

(51) Int. Cl.
    *B60R 22/18*          (2006.01)
    *B60R 13/00*          (2006.01)
    *B60N 2/28*           (2006.01)
(52) U.S. Cl.
    CPC .............. *B60R 22/18* (2013.01); *B60R 13/00* (2013.01); *B60N 2/28* (2013.01)

(58) Field of Classification Search
    CPC ........... B60R 22/18; B60R 13/00; B60N 2/28
    See application file for complete search history.

(56) References Cited

U.S. PATENT DOCUMENTS 6,267,442 B1 * 7/2001 Shiino .................. B60N 2/2809
                                                        297/254
2009/0212610 A1   8/2009 Yajima
2020/0331401 A1  10/2020 Yilma et al.

FOREIGN PATENT DOCUMENTS

JP        2008273430 A  * 11/2008  ........... B60N 2/2809
JP        2009137520 A    6/2009
KR       20180022191 A  *  3/2018  ............. B60N 2/012

OTHER PUBLICATIONS

KR-20180022191-A Machine English Translation (Year: 2018).*

(Continued)

*Primary Examiner* — Jason D Shanske
*Assistant Examiner* — Matthew James O'Neill
(74) *Attorney, Agent, or Firm* — Maier & Maier, PLLC

(57)                ABSTRACT

A cover for a cavity in which a belt anchor is arranged, including a contact region which is provided for contact with a surface of a vehicle interior component surrounding the cavity. The contact region has a contact surface on its inner side facing the surface surrounding the cavity in the case of use and at least one opening region, the inner surface of which facing the cavity in the case of use is spaced apart from the contact surface in a direction perpendicular to the latter. The contact region surrounds the opening region in some regions and is connected thereto, and the contact region does not surround the opening region in a lead-through region of the opening region and this lead-through region forms the outer edge of the cover. The cover further includes at least two fastening elements.

21 Claims, 1 Drawing Sheet

(56)                    References Cited

OTHER PUBLICATIONS

JP-2008273430-A Machine English Translation (Year: 2008).*
Examination Report issued on Mar. 16, 2023, in corresponding
German Application No. 102022124207.2, 4 pages.
International Search Report and Written Opinion issued on Dec. 14,
2023, in corresponding International Application No. PCT/EP2023/
075795, 16 pages.
International Preliminary Report on Patentability issued on Apr. 3,
2025, in corresponding International Application No. PCT/EP2023/
075795, 11 pages.

* cited by examiner

COVER AND VEHICLE INTERIOR COMPONENT

FIELD

The invention relates to a cover for a cavity in which a belt anchor is arranged, comprising a contact region which is intended to be in contact with a surface of a vehicle interior component surrounding the cavity, wherein the contact region has a contact surface on its inner side facing the surface surrounding the cavity in use, and at least one opening region, the inner surface of which facing the cavity in use is spaced from the contact surface in a direction perpendicular to the contact surface, wherein the contact region surrounds the opening region in regions and is connected to it, wherein in a lead-through region of the opening region the contact region does not surround the opening region and this lead-through region forms the outer edge of the cover. The cover further comprises at least two fastening elements which are provided for the form-fitting and/or force-fitting connection of the cover to the cavity. The invention further relates to a vehicle interior component with a cover and a method for attaching a belt to a vehicle interior component.

BACKGROUND

Vehicles often comprise devices that allow easy installation of transport devices for babies and children inside the vehicle. The so-called Isofix attachment for child seats or baby carriers is widely used. In addition or as an alternative to this, there are solutions in which a belt for securing child seats or baby carriers is passed over the upward edge of a vehicle seat and used for fastening. Such solutions are also called top tether attachment. With such an attachment, a belt from the child transport device is attached to a vehicle interior component, for example a vehicle seat. To attach the belt to the vehicle interior component, a belt anchor is provided thereon, which is easily accessible and enables the belt to be attached quickly and easily. Since it is not always necessary to install a transport device for children in the vehicle, there is a requirement to integrate such a belt anchor in a protected and unobtrusive manner in the vehicle interior. The belt anchor should be easily accessible and protected from damage and dirt. Furthermore, the belt anchor should be positioned in such a way that there is no risk of injury to passengers in the vehicle.

US 2020/0331401 A1 describes a device which is arranged in the vicinity of a belt anchor. This device includes a foldable hook that can be used as a cover when the belt anchor is not in use.

JP 2008273430 A also discloses a component which surrounds a belt anchor. This component comprises a hinged lid which can be fixed in a first position when the belt anchor is not in use and in a second position when the belt anchor is in use.

JP 2009137520 A describes a foldable cover for a belt anchor. This cover is connected to the adjacent interior surface via a film hinge and is thus integrated into it.

The known devices for covering a belt anchor comprise multiple individual parts and are therefore complex in structure. In addition, these solutions, especially the foldable parts of the devices, pose a risk of damage during everyday use.

SUMMARY

The object of the invention is therefore to propose solutions with which a belt anchor can be integrated into a vehicle more stably and easily, wherein the belt anchor should be protected and easily accessible.

The object of the invention is achieved by a cover for a cavity in which a belt anchor is arranged, comprising a contact region which is intended for contact on a surface of a vehicle interior component surrounding the cavity, wherein the contact region has a contact surface on its inner side facing the surface surrounding the cavity in use, at least one opening region, the inner surface of which, in use, faces the cavity and is spaced apart from the contact surface in a direction perpendicular to the latter, wherein the contact region partially surrounds the opening region and is connected to it, wherein the contact region does not surround the opening region in a lead-through region of the opening region and this lead-through region forms the outer edge of the cover, at least two fastening elements which are provided for the positive and/or force-fitting connection of the cover to the cavity, wherein the fastening elements protrude beyond the contact surface on the side opposite the opening region, wherein a lead-through plane bisects the lead-through region and is oriented perpendicular to the contact surface adjacent to the lead-through region and the fastening elements are arranged on opposite sides of the lead-through plane at the same distance from the lead-through plane, wherein in a direction parallel to the lead-through plane and parallel to the support surface, the cover is limited on a first side by the lead-through region and on a second side opposite the first side by the contact region.

The cover according to the invention is intended to cover a cavity in a vehicle interior component in which a belt anchor is arranged. The cover according to the invention consists of a single component which can be easily manufactured and used.

The cover comprises a contact region, which forms the region which in use rests on the surface surrounding the cavity. The term use refers to any situation in which the cover closes the cavity at least in part. In use, the belt anchor can be connected to a belt or the belt anchor can not be connected to a belt. The contact region comprises a contact surface facing the vehicle interior component in use. Preferably, this contact surface is shaped complementarily to the shape of the surrounding surface of the vehicle interior component. In use, the contact surface lies flush with the surrounding surface. The cover further comprises an opening region which is arranged adjacent to the contact region, wherein both regions are connected to one another. In use, the inner surface facing the cavity is arranged at a distance from the contact surface. In use, the inner surface is thus arranged at a distance from the surface of the vehicle interior component surrounding the cavity and thus enables a belt to be passed between the cover and the surrounding surface. The contact region surrounds in regions the opening region and merges into it. However, in a lead-through region of the opening region, the contact region does not surround the opening region, which means that this lead-through region is located on the outer edge of the cover. In use, there is thus a distance between the inner surface and the surface surrounding the cavity in the lead-through region, which can be used to pass a belt through. The cover further comprises at least two fastening elements which, in use, come into operative connection with the cavity and detachably connect the cover to the cavity. The fastening elements can, for example, be designed as clip or snap-in elements, which interact with the cavity in a form-fitting and/or force-fitting manner. An imaginary lead-through plane serves to simplify the description of the shape of the cover according to the invention. The lead-through plane bisects the lead-through region and is simultaneously oriented perpendicular to the partial region of the contact surface which is arranged adjacent to the lead-through region. The lead-through region forms part of the outer edge of the cover. The lead-through plane bisects the lead-through region in a plan view of the partial region of the outer edge of the cover in which the lead-through region is arranged. The lead-through plane is preferably also the central plane of the opening region. According to the invention, the two fastening elements are each arranged on one side of the lead-through plane, wherein the distance of the fastening elements to the lead-through plane is identical. The cover according to the invention is delimited on a first side by the lead-through region in a direction parallel to the lead-through plane and at the same time parallel to the support surface, in particular to the support surface in the partial region which directly adjoins the lead-through region. This means that in this direction an outer edge of the cover is formed by the lead-through region. On the opposite side in this direction, the cover is delimited by a partial region of the contact region. As a result, in use the cover on the first side, where the lead-through region is located, does not rest on the surrounding surface. On the opposite side of the cover, however, it sits flush with the surrounding surface. This creates an opening on one side of the cover for the passage of a belt, while the opposite side lies flush against the vehicle interior component and thus closes the cavity.

The cover according to the invention has the advantage that it is formed by a single component. The fastening elements are preferably designed to be elastically deformable so that there are no parts that are mounted so that they can move relative to one another and that can be damaged during use. Because the two fastening elements are arranged at the same distance from the lead-through plane, the cover can be attached to a vehicle interior component in two different positions. In the non-use position, the cover can be used to cover and protect the cavity and the belt anchor located therein as long as no belt is attached to the belt anchor. In the use position where a belt is attached to the belt anchor, the cover can also be used to protect the cavity and the belt anchor, while at the same time easily allowing the belt to be passed between the cover and the surrounding surface of the vehicle interior component. Changing between these two positions is done by simply removing the cover, turning it and then reinserting it. The cover according to the invention thus brings about a stable and simple integration of a belt anchor in a vehicle interior component, wherein the cover always maintains the functional reliability of the belt anchor both with and without the belt attached. Compared to known solutions, the structure of the cover is much simpler, which means that the cover can be provided cost-effectively. The fact that the cover can be used to close the cavity even when a belt is attached to the belt anchor ensures that it cannot be lost. The lead-through region combines two functions: in the non-use position, the lead-through region can be used to facilitate removal of the cover from the cavity by serving as a handle into which one or more fingers can be inserted for removal. In the use position, a belt attached to the belt anchor can be guided through the lead-through region without being clamped between the cover and the surrounding surface of the cavity. By providing the two fastening elements, which belong to the cover and which are connected to it, no additional fastening elements are required. This makes it very easy to remove the cover from the cavity and reinsert it.

In an embodiment, it is provided that the contact region and the opening region together form a curved shell and the two fastening elements extend away from the contact surface in the direction opposite to the curvature, wherein the fastening elements are fastened to the contact region or to the opening region. A shell represents a component that has a significantly smaller thickness than its width and length. For example, the thickness is at least ten times smaller than the length and/or width of the shell-shaped cover. In this embodiment, the opening region forms a curvature relative to the contact region, which, in use, protrudes beyond the surface surrounding the cavity and beyond the contact region. The curvature extends in the opposite direction to the fasteners. This design is particularly lightweight. Another advantage is that the curvature can be designed in such a way that it blends harmoniously into the appearance of the vehicle interior.

In a further embodiment, it is provided that in a plan view of the contact surface, the contact region surrounds the opening region in the circumferential direction around the cover by at least 75% of the circumferential length and the lead-through region forms the edge of the cover in the remaining region of the circumferential length. The circumferential direction is meant to be the direction which is oriented tangentially to the outer edge of the cover. The cover has a circumferential length in this circumferential direction. In this embodiment, at least 75% of the circumferential length is formed by the contact region, which forms the outer edge of the cover in this region of the circumferential length. The remaining region of the circumferential length is formed by the lead-through region. In the case of a cover that is rectangular in plan view, for example, three outer sides can be formed by the contact region and the fourth outer side by the lead-through region. In this way, good protection of the cavity against contamination and the safe passage of a belt out of the cavity are ensured at the same time.

Optionally, the contact surface of the contact region can merge continuously into the inner surface of the opening region. In this way, there are no sharp edges on the side of the cover that is oriented towards the cavity in use, which facilitates the passage of the belt out of the cavity.

In an embodiment, it is provided that the distance between the contact surface of the contact region and the inner surface of the opening region increases along the lead-through plane in the direction towards the lead-through region. In this embodiment, the distance between the inner surface and the contact surface increases along the lead-through plane. Preferably, this distance is maximum in the lead-through region. This distance can increase continuously along the lead-through plane. However, it is also possible that the distance is constant in some regions along the lead-through plane and only increases shortly before the lead-through region, for example in the last quarter of the length of the opening region. The variation of this distance can be easily adjusted depending on where in the cavity the belt anchor is located and in which direction the belt should continue to be led starting from the cover. The distance between the support surface and the surface of the contact region and the opening region facing away from the cavity can be selected independently of this distance between the inner surfaces of the support surface. For example, the surface facing away from the cavity may have a constant distance from the support surface over the entire cover.

Alternatively, it is possible for the surface of the cover facing away from the cavity to be parallel to the surface of the cover facing towards the cavity.

In a further embodiment, it is provided that the fastening elements are arranged adjacent to the contact surface symmetrically with respect to the lead-through plane or that the cover is designed completely symmetrically with respect to the lead-through plane. In this embodiment, at least the fastening elements are arranged symmetrically to the lead-through plane. This promotes identical behavior when inserting the cover into the cavity, especially in the different positions: use position and non-use position. For example, connecting elements can be arranged locally in the cavity, which interact with the fastening elements when attaching the cover. Due to the symmetrical arrangement of the fastening elements, the same fastening elements can be used as counterparts in the cavity in two different rotational positions of the cover. In a preferred embodiment, the entire cover is shaped symmetrically to the lead-through plane. This creates a particularly harmonious appearance in both positions.

Optionally, the contact surface is designed to be flat or curved about at least one curvature axis which is oriented perpendicular to the lead-through plane. The contact surface, which is intended for contact with a surface surrounding the cavity, is preferably designed to be complementary in shape to this surface. If the surface is flat, the contact surface can also be flat. However, if the surface is curved, for example around a horizontally oriented curvature axis, the contact surface can also be curved around an axis. The radius of curvature of the contact surface is preferably identical to the radius of curvature of the surface. It is also possible for the contact surface to be flat in some regions and curved in some regions. By designing the contact surface in a shape that complements the surface, it is ensured that the contact region always lies flush with the surface, thus preventing dirt from penetrating the cavity.

The object of the invention is further achieved by a vehicle interior component with a belt anchor, wherein the belt anchor is arranged in a cavity in the vehicle interior component that is open to the outside and this cavity is at least in regions surrounded by a surface of the vehicle interior component, wherein a cover according to one of the previously described embodiments closes the cavity at least in regions, wherein the contact surface of the contact region rests on the surface surrounding the cavity, the two fastening elements are at least partially introduced into the cavity and an opening is present between the lead-through region of the opening region and the surface surrounding the cavity, which opening is provided for the passage of a belt and for removing the cover from the cavity.

The vehicle interior component according to the invention comprises a belt anchor which is arranged in a cavity of the vehicle interior component and which is covered by a cover according to any one of the previously described embodiments. The vehicle interior component can, for example, be a vehicle seat. Alternatively, the vehicle interior component can also be formed by a console, a body panel or similar. The cavity is surrounded at least in regions by a surface which adjoins the cavity. The cover is inserted into the cavity with its fastening elements and rests with its contact surface on the surface in some regions. Due to the shape of the cover, when the cover is inserted there is an opening between the surface surrounding the cavity and the lead-through region.

This opening is intended to guide a belt from the belt anchor located in the cavity under the cover to the outside.

The vehicle interior component according to the invention makes it possible to integrate a belt anchor into a vehicle more stably and easily than with known solutions. The belt anchor is arranged in a cavity and protected by a cover according to the invention. In addition, the cover conceals the belt anchor so that it does not disrupt the appearance of the vehicle interior. The cover according to the invention represents a very simple and cost-effective solution for covering the cavity. The cover can be inserted into the cavity in two different positions and can be secured in the cavity both with and without a belt attached. In this way, the cover cannot be lost and the vehicle interior component according to the invention is permanently retained with all its functionality.

In an embodiment of the vehicle interior component, it is provided that a use position of the cover is provided in which the lead-through region points vertically upwards and a non-use position of the cover is provided in which the lead-through region points vertically downwards, wherein the cover can be transferred from the use position to the non-use position and vice versa by removing the cover from the cavity, rotating the cover about an axis of rotation parallel to the lead-through plane and perpendicular to the contact surface by 180° and by reinserting it into the cavity. The cover of the vehicle interior component can be connected to the cavity in two different positions. The use position is intended for an application in which a belt is connected to the belt anchor. The non-use position is intended for an application in which no belt is connected to the belt anchor. The cover is attached in the same way in both positions, only the rotational orientation of the cover relative to the surface is different. A change between the two positions is easily possible by changing the orientation of the cover relative to the surface surrounding the cavity.

The object of the invention is finally achieved by a method for attaching a belt to a vehicle interior component according to any one of the previously described embodiments, in which at the beginning of the method the cover is in a non-use position in which the lead-through region points downwards in a vertical direction, comprising the steps A) removing the cover from the cavity, wherein the lead-through region is used as a removal aid, B) attaching a belt to the belt anchor located in the cavity, C) aligning the cover such that the contact surface is parallel to the surface surrounding the cavity and the lead-through region is oriented vertically upwards, D) reinserting the cover after the cover is in a position of use, wherein during reinserting the fastening elements are introduced into the cavity and the contact surface is brought into contact with the surface surrounding the cavity, wherein the belt is passed through the opening between the surface surrounding the cavity and the lead-through region.

The method according to the invention allows a simple attachment of a belt to a vehicle interior component. The advantages of the method arise from the fact that the belt anchor is particularly well integrated into the vehicle interior component thanks to the cover and is easily accessible when attaching the belt.

The method according to the invention starts from a state in which the vehicle interior component is in a non-use position and is to be transferred to the use position. The method according to the invention can be carried out in the reverse order of the method steps and then serves to transfer from the use position to the non-use position.

In a first step A), the cover is removed from the cavity, wherein the opening between the lead-through region and the surrounding surface can be used to insert one or more fingers and thus pull the cover out of the cavity.

In a second step B), a belt is now attached to the belt anchor. This attachment is particularly simple because the cover is completely removed during this step and does not hinder access to the cavity.

In a third step C), the cover is prepared for reinsertion by rotating it so that the lead-through region is oriented verti- cally upwards.

Subsequently, in a fourth step D), the cover is reinserted into the cavity, wherein the belt is guided through the opening between the lead-through region and the surface surrounding the cavity. This way, the belt can move freely between the cover and the surface and will not get caught.

The method according to the invention can be carried out in a simple manner. Due to the simple design and sturdy construction of the cover, this method can be performed frequently before significant wear occurs on the vehicle interior component.

Features, effects, and advantages that are disclosed in connection with the cover are also considered to be dis- closed in connection with the vehicle interior component and the method. This also applies in the reverse direction, features, effects, and advantages that are disclosed in con- nection with the vehicle interior component and method are also considered to be disclosed in connection with the cover.

BRIEF DESCRIPTION OF THE FIGURES

The invention is schematically illustrated in the drawings with the aid of embodiments and is described further with reference to the drawings. In the figures.

DETAILED DESCRIPTION

Figure 1:
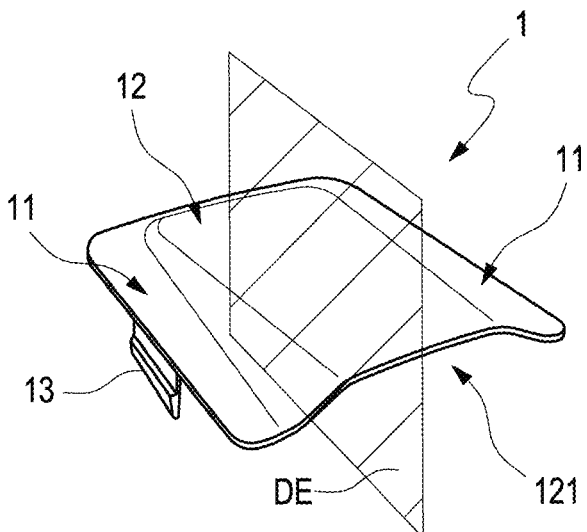
FIG. 1 shows a perspective view of an embodiment of a cover according to the invention.
Figure 2:
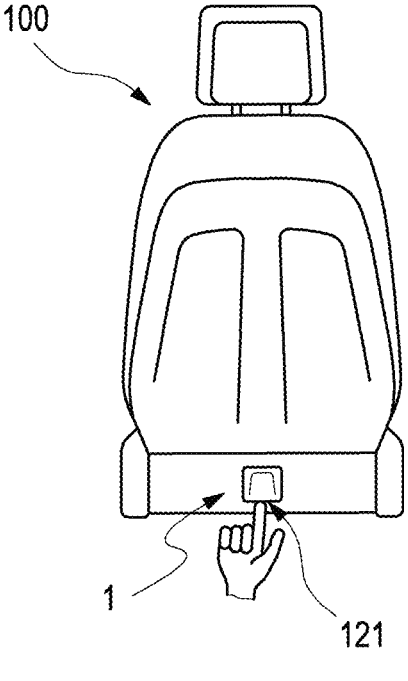
FIG. 2 shows, in a schematic view an embodiment of a vehicle interior component according to the invention in the position of non-use.
Figure 3:
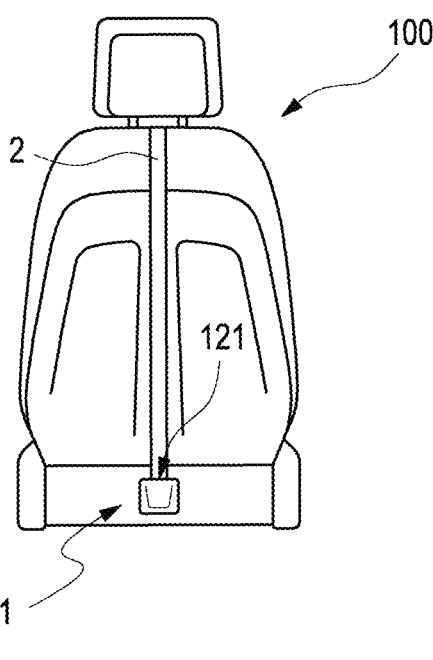
FIG. 3 shows, in a schematic view, the embodiment from FIG. 2 in the position of use.

FIG. 1 shows a perspective view of an embodiment of a cover 1 according to the invention. In the embodiment shown, the cover 1 is designed as a curved shell. In the middle of the cover 1 is the opening region 12, which is curved upwards in the illustration. In the embodiment shown, the opening region 12 is surrounded on three of four sides by the contact region 11. In the embodiment shown, the contact region 11 is not curved but is flat all around. The contact surface is arranged on the side of the contact region 11 pointing downwards in the illustration, which, in use, comes into contact with a surface of a vehicle interior component 100 surrounding a cavity. The cover comprises a total of two fastening elements 13, which in the illustration protrude downwards over the contact surface. These fasten- ing elements penetrate into the cavity in use and fix the cover 1 in the cavity in a form-fitting and/or force-fitting manner. In the illustration, only one of the two fastening elements 13 can be seen; the other fastening element 13 is located on the right-hand side and is covered by the contact region 11 and the opening region 12. The opening region 12 has an inner surface facing downwards in the illustration, which is spaced from the contact surface in a direction perpendicular to the latter. In the embodiment shown, the contact region surrounds the opening region on three of four sides, which corresponds to approximately 85% of the circumferential length of the entire cover 1. In the remaining region of the circumferential length, the lead-through region 121 forms the outer edge of the cover 1. In use, in which the cover 1 is introduced onto or into a cavity, there is an opening in the region of the lead-through region 121 between the cover 1 and the surrounding surface of the vehicle interior compo- nent 100. The two possibilities for using this opening are shown in FIGS. 2 and 3. The imaginary lead-through plane DE bisects the lead-through region 121, viewed in a plan view of the lead-through region 121 from the front right onto the cover 1. At the same time, the lead-through plane DE is oriented perpendicular to the contact surface of the contact region 11. The two fastening elements 13 are arranged on opposite sides of the lead-through plane DE at the same distance from the lead-through plane DE. In the embodiment shown, the two fastening elements 13 are arranged sym- metrically to the lead-through plane DE. Furthermore, the entire cover in the embodiment shown is designed sym- metrically to the lead-through plane DE. A particular advan- tage of the cover 1 is that it can be used in two different positions to cover a cavity. If the orientation shown in FIG. 1 corresponds, for example, to the non-use position from FIG. 2, the cover 1 can be transferred into the use position shown in FIG. 3 by a simple rotation about an axis perpen- dicular to the support surface. In the perspective shown in FIG. 1, the lead-through region 121 would point to the rear left in the use position, whereas the region of the cover pointing to the rear left in the current illustration in FIG. 1 would point to the front right, where the lead-through region 121 points in the illustration. In the embodiment shown, the cover 1 is designed as a plastic injection-molded part, which can be manufactured cost-effectively.

In a direction parallel or along the lead-through plane DE and at the same time parallel to the contact surface, which runs from the front right to the rear left in the illustration, the cover 1 is delimited on a first side by the edge which is formed by the lead-through region 121. This first side is oriented towards the front right. In this direction on the opposite second side, which is oriented to the rear left in the illustration, the cover 1 is delimited by the contact region 11, which forms the outer edge of the cover 1 on this second side. Starting from the second side, at the rear left in the illustration, along the lead-through plane DE, the distance between the contact surface and the inner surface of the opening region 12 increases in the embodiment shown. This distance is greatest in the lead-through region 121. This increasing distance along the lead-through plane DE facili- tates the passage of a belt and ensures that the belt is not clamped between the cover 1 and the belt anchor or the surface surrounding the cavity in use. In the embodiment shown, the wall thickness of the contact region 11 and the opening region 12 is essentially constant over the entire surface of the cover 1 and the contact region 11 merges continuously into the opening region 12. Alternatively, it is also possible for the wall thickness to vary across the cover 1 and, for example, to be greater in the contact region 11 than in the opening region 12. By varying the wall thickness, the visual appearance of the cover 1 can be varied and thus adapted to the environment inside the vehicle.

FIG. 2 shows, in a schematic view an embodiment of a vehicle interior component 100 according to the invention in the position of non-use, In the illustrated embodiment, the vehicle interior component 100 is formed by a vehicle seat which has a cavity with a belt anchor arranged therein. This cavity is located at the rear in the lower region of the vehicle seat in the direction of travel. The cavity is completely surrounded by a surface of the vehicle interior component 100, which here can be formed, for example, by a flat surface covered with fabric. The cavity is closed by a cover 1, which can be easily removed from the cavity and reinserted into it. The contact surface of the contact region 11 of the cover 1 rests on the surface surrounding the cavity and the two fastening elements 13 are introduced in regions into the cavity and connected to it in a form-fitting and/or force-fitting manner. The lead-through region 121 is oriented downwards in the non-use position shown in FIG. 2. Thus, the opening which exists between the lead-through region 121 and the surface surrounding the cavity is also oriented downwards in this position. As a result, the cavity is very well protected against contamination by the cover 1, in particular objects falling from above cannot penetrate into the cavity. The illustrated non-use position of the cover 1 or the vehicle interior component 100 is selected when no belt 2 is connected to the belt anchor in the cavity. To attach a belt 2, the method according to the invention can be carried out, by which a belt 2 can be attached to the vehicle interior component 100. In a first step, the cover 1 is removed from the cavity, with the lead-through region 121 serving as a removal aid. As symbolically shown in the drawing, for example, a finger can be inserted into the opening between the lead-through region 121 and the surrounding surface and the cover 1 can thus be easily removed from the cavity against the resistance of the two fastening elements 13. In a second step, a belt 2 can now be attached with the cover 1 removed, wherein the belt anchor in the cavity is very easily accessible during this attachment. In a third step, the cover is finally rotated relative to the state shown in FIG. 2. This rotation occurs around an axis which is oriented perpendicular to the support surface. The cover 1 is rotated until the lead-through region 121 is oriented vertically upwards. In this orientation, the cover 1 is reinserted into the cavity. This state is shown in FIG. 3.

FIG. 3 shows, in a schematic view, the embodiment from FIG. 2 in the position of use. In the illustrated position of use, the lead-through region 121 points vertically upwards. The belt 2 connected to the belt anchor inside the cavity is guided vertically upwards on the rear side of the vehicle interior component 100 and can be used on the front side, for example, to attach a transport device for children. The belt 2 is led from the interior of the cavity through the opening between the lead-through region and the surrounding surface and is thus freely movable. Also in the illustrated position of use, the cover 1 effectively protects the cavity and the belt anchor located therein from contamination and at the same time allows the belt 2 to pass through.

LIST OF REFERENCE NUMERALS 1 cover
11 contact region
12 opening region
121 lead-through region
13 fastening element
2 belt
100 vehicle interior component
DE lead-through plane

The invention claimed is:

1. A cover for a cavity in which a belt anchor is arranged, comprising:
    a contact region which is intended for contact on a surface of a vehicle interior component surrounding the cavity,
        wherein the contact region has a contact surface on its inner side facing the surface surrounding the cavity in use,
    at least one opening region, the inner surface of which, in use, faces the cavity and is spaced apart from the contact surface in a direction perpendicular to the latter, wherein the contact region partially surrounds the opening region and is connected to it, wherein the contact region does not surround the opening region in a lead-through region of the opening region and this lead-through region forms the outer edge of the cover,
    at least two fastening elements which are provided for the form-fitting and/or force-fitting connection of the cover to the cavity, wherein the fastening elements protrude beyond the contact surface on the side opposite the opening region,
    wherein a lead-through plane bisects the lead-through region and is oriented perpendicular to the contact surface adjacent to the lead-through region and the fastening elements are arranged on opposite sides of the lead-through plane at the same distance from the lead-through plane,
    wherein, in a direction parallel to the lead-through plane and parallel to the contact surface, the cover is delimited on a first side by the lead-through region and on a second side opposite the first side by the contact region,
    wherein a use position of the cover is provided, in which the lead-through region points upwards in the vertical direction, and furthermore a non-use position of the cover is provided, in which the lead-through region points downwards in the vertical direction, and
    wherein the cover can be transferred from the use position to the non-use position and vice versa by removing the cover from the cavity, rotating the cover by 180° about an axis of rotation parallel to the lead-through plane and perpendicular to the contact surface and reinserting it into the cavity.

2. The cover according to claim 1, wherein the contact region and the opening region together form a curved shell and the two fastening elements extend away from the contact surface in the direction opposite to the curvature, wherein the fastening elements are fastened to the contact region or to the opening region.

3. The cover according to claim 1, wherein, in a plan view of the contact surface, the contact region surrounds the opening region in the circumferential direction around the cover by at least 75% of the circumferential length and the lead-through region forms the edge of the cover in the remaining region of the circumferential length.

4. The cover according to claim 1, wherein the contact surface of the contact region merges continuously into the inner surface of the opening region.

5. The cover according to claim 1, wherein the distance between the contact surface of the contact region and the inner surface of the opening region increases along the lead-through plane in the direction towards the lead-through region.

6. The cover according to claim 1, wherein the fastening elements are arranged adjacent to the contact surface symmetrically to the lead-through plane or which is designed completely symmetrically to the lead-through plane.

7. The cover according to claim 1, wherein the contact surface is flat or curved about at least one axis of curvature which is oriented perpendicular to the lead-through plane.

8. A vehicle interior component with a belt anchor, wherein the belt anchor is arranged in an outwardly open cavity in the vehicle interior component and this cavity is surrounded at least in regions by a surface of the vehicle interior component, wherein a cover according to claim 1 closes the cavity at least in regions, wherein the contact surface of the contact region rests on the surface surrounding the cavity, the two fastening elements are introduced at least in regions into the cavity and an opening is present between the lead-through region of the opening region and the surface surrounding the cavity, which opening is provided for the passage of a belt and for removing the cover from the cavity.

9. A method for attaching a belt to a vehicle interior component according to claim 8, in which at the start of the method the cover is in a non-use position in which the lead-through region points downwards in the vertical direction, comprising the steps:

A) removing the cover from the cavity, wherein the lead-through region is used as a removal aid, B) attaching a belt to the belt anchor located in the cavity, C) aligning the cover such that the contact surface is parallel to the surface surrounding the cavity and the lead-through region is oriented vertically upwards, D) reinserting the cover after the cover is in a position of use, wherein during reinserting the fastening elements are introduced into the cavity and the contact surface is brought into contact with the surface surrounding the cavity, wherein the belt is passed through the opening between the surface surrounding the cavity and the lead-through region.

10. The cover according to claim 2, wherein, in a plan view of the contact surface, the contact region surrounds the opening region in the circumferential direction around the cover by at least 75% of the circumferential length and the lead-through region forms the edge of the cover in the remaining region of the circumferential length.

11. The cover according to claim 2, wherein the contact surface of the contact region merges continuously into the inner surface of the opening region.

12. The cover according to claim 3, wherein the contact surface of the contact region merges continuously into the inner surface of the opening region.

13. The cover according to claim 2, wherein the distance between the contact surface of the contact region and the inner surface of the opening region increases along the lead-through plane in the direction towards the lead-through region.

14. The cover according to claim 3, wherein the distance between the contact surface of the contact region and the inner surface of the opening region increases along the lead-through plane in the direction towards the lead-through region.

15. The cover according to claim 4, wherein the distance between the contact surface of the contact region and the inner surface of the opening region increases along the lead-through plane in the direction towards the lead-through region.

16. The cover according to claim 2, wherein the fastening elements are arranged adjacent to the contact surface symmetrically to the lead-through plane or which is designed completely symmetrically to the lead-through plane.

17. The cover according to claim 3, wherein the fastening elements are arranged adjacent to the contact surface symmetrically to the lead-through plane or which is designed completely symmetrically to the lead-through plane.

18. The cover according to claim 4, wherein the fastening elements are arranged adjacent to the contact surface symmetrically to the lead-through plane or which is designed completely symmetrically to the lead-through plane.

19. The cover according to claim 5, wherein the fastening elements are arranged adjacent to the contact surface symmetrically to the lead-through plane or which is designed completely symmetrically to the lead-through plane.

20. A cover for a cavity in which a belt anchor is arranged, comprising:

a contact region which is intended for contact on a surface of a vehicle interior component surrounding the cavity, wherein the contact region has a contact surface on its inner side facing the surface surrounding the cavity in use, at least one opening region, the inner surface of which, in use, faces the cavity and is spaced apart from the contact surface in a direction perpendicular to the latter, wherein the contact region partially surrounds the opening region and is connected to it, wherein the contact region does not surround the opening region in a lead-through region of the opening region and this lead-through region forms the outer edge of the cover, at least two fastening elements which are provided for the form-fitting and/or force-fitting connection of the cover to the cavity, wherein the fastening elements protrude beyond the contact surface on the side opposite the opening region, wherein a lead-through plane bisects the lead-through region and is oriented perpendicular to the contact surface adjacent to the lead-through region and the fastening elements are arranged on opposite sides of the lead-through plane at the same distance from the lead-through plane, wherein, in a direction parallel to the lead-through plane and parallel to the contact surface, the cover is delimited on a first side by the lead-through region and on a second side opposite the first side by the contact region, wherein the contact region and the opening region together form a curved shell and the two fastening elements extend away from the contact surface in the direction opposite to the curvature, and wherein the fastening elements are fastened to the contact region or to the opening region.

21. A cover for a cavity in which a belt anchor is arranged, comprising:

a contact region which is intended for contact on a surface of a vehicle interior component surrounding the cavity, wherein the contact region has a contact surface on its inner side facing the surface surrounding the cavity in use, at least one opening region, the inner surface of which, in use, faces the cavity and is spaced apart from the contact surface in a direction perpendicular to the latter, wherein the contact region partially surrounds the opening region and is connected to it, wherein the contact region does not surround the opening region in a lead-through region of the opening region and this lead-through region forms the outer edge of the cover, at least two fastening elements which are provided for the form-fitting and/or force-fitting connection of the cover to the cavity, wherein the fastening elements protrude beyond the contact surface on the side opposite the opening region, wherein a lead-through plane bisects the lead-through region and is oriented perpendicular to the contact surface adjacent to the lead-through region and the fastening elements are arranged on opposite sides of the lead-through plane at the same distance from the lead-through plane, wherein, in a direction parallel to the lead-through plane and parallel to the contact surface, the cover is delimited on a first side by the lead-through region and on a second side opposite the first side by the contact region, and wherein the distance between the contact surface of the contact region and the inner surface of the opening region increases along the lead-through plane in the direction towards the lead-through region.

* * * * *